US009473563B2

(12) United States Patent
Gao (10) Patent No.: US 9,473,563 B2
(45) Date of Patent: Oct. 18, 2016

(54) METHODS AND SYSTEMS FOR LOADING DATA INTO TERMINAL DEVICES (71) Applicant: TENCENT TECHNOLOGY (SHENZHEN) COMPANY LIMITED, Shenzhen (CN)

(72) Inventor: Mingyu Gao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 295 days.

(21) Appl. No.: 14/185,256

(22) Filed: Feb. 20, 2014

(65) Prior Publication Data

US 2014/0258881 A1 Sep. 11, 2014

Related U.S. Application Data (63) Continuation of application No. PCT/CN2013/087118, filed on Nov. 14, 2013.

(30) Foreign Application Priority Data

Mar. 8, 2013 (CN) .......................... 2013 1 0074166

(51) Int. Cl.
*G06F 3/00* (2006.01)
*H04L 29/08* (2006.01)
*G06F 17/30* (2006.01)

(52) U.S. Cl.
CPC ......... *H04L 67/10* (2013.01); *G06F 17/30902* (2013.01)

(58) Field of Classification Search
CPC .............................................. G06F 17/30902
USPC ........................................................ 715/748
See application file for complete search history.

(56) References Cited

U.S. PATENT DOCUMENTS

| 5,616,876 | A | * | 4/1997 | Cluts | ................. | G06F 17/30749 348/E7.071 |
| 7,024,681 | B1 | * | 4/2006 | Fransman | .......... | H04N 7/17327 348/E5.008 |
| 7,772,477 | B2 | * | 8/2010 | Okamoto | ................. | G10H 7/02 84/601 |
| 7,982,116 | B2 | * | 7/2011 | Okamoto | ................. | G10H 7/02 707/689 |
| 8,397,164 | B2 | * | 3/2013 | Hose | ....................... | A63J 25/00 715/716 |
| 8,914,462 | B2 | * | 12/2014 | Chang | ................... | G06F 3/1454 370/338 |

(Continued)

FOREIGN PATENT DOCUMENTS

| CN | 102591954 A | 7/2012 |
| WO | 2012122934 A1 | 9/2012 |

OTHER PUBLICATIONS

The World Intellectual Property Organization (WIPO) International Search Report for PCT/CN2013/087118 Feb. 20, 2014.

Primary Examiner — William Titcomb
(74) Attorney, Agent, or Firm — Anova Law Group, PLLC (57) ABSTRACT A method and system for loading data into a terminal device are disclosed. The method includes the steps of displaying icons in a user interface of the terminal device and determining whether data correspond to an icon in a defined display area. The method further includes loading the data into the terminal device if the data correspond to an icon in the defined display area and deleting the data from the terminal device if the data do not correspond to an icon in the defined display area. The method and system consistent with the present disclosure may improve the user experience for browsing and reading online storybooks.

20 Claims, 4 Drawing Sheets

(56) References Cited

U.S. PATENT DOCUMENTS

| | | | |
|---|---|---|---|
| 2002/0094787 A1 | 7/2002 | Avnet | |
| 2002/0157036 A1* | 10/2002 | Nakamura | H04L 29/06 714/4.1 |
| 2007/0282787 A1* | 12/2007 | Shirai | G06F 17/30038 |
| 2008/0048975 A1* | 2/2008 | Leibow | G06F 3/023 345/156 |
| 2013/0091054 A1* | 4/2013 | Nathan | G11B 19/025 705/39 |
| 2014/0129618 A1* | 5/2014 | Panje | H04N 21/26258 709/203 |
| 2015/0358398 A1* | 12/2015 | Chang | G06F 3/1454 715/748 |

* cited by examiner

METHODS AND SYSTEMS FOR LOADING DATA INTO TERMINAL DEVICES

CROSS-REFERENCES TO RELATED APPLICATIONS

Related Applications

This application is a continuation application of PCT Patent Application No. PCT/CN2013/087118, filed on Nov. 14, 2013, which is based upon and claims the benefit of priority from Chinese Patent Application No. 201310074166.3, filed on Mar. 8, 2013, the entire contents of all of which are incorporated herein by reference.

FIELD OF THE INVENTION

The present invention relates to data processing and, more particularly, to methods and systems for loading data into a terminal device.

BACKGROUND

As the number of software applications in a terminal device increases, users often demand more functions from the software applications on the device. For example, a user may open many online storybooks on a terminal device, such as a tablet computer. After the user opens the storybooks, the terminal device may need to temporarily load the contents of the online storybooks into its memory. After the online storybooks are loaded, the user may read any of the loaded online storybooks by retrieving the content from the memory. In this example, because the user may open multiple online storybooks at the same time, the terminal device may need to load a large number of online storybooks. As the user opens up more online storybooks, the terminal device may need to load even more contents into its memory. Loading a large number of online storybooks may consume more storage and CPU resource of the terminal device, which may cause performance issues in the terminal device.

The disclosed method and system are directed to solve one or more problems set forth above and other problems.

BRIEF SUMMARY OF THE DISCLOSURE

Embodiments consistent with the present disclosure provide a method, system, terminal device, or a server for loading data into a terminal device. Embodiments consistent with the present disclosure further improve the performance of the terminal device and the user experience.

One aspect of the present disclosure provides a method and system for loading data into a terminal device. The method includes the steps of displaying icons in a user interface of the terminal device, and determining whether data correspond to the icons that are in a defined display area. The method further includes loading data into the terminal device if the data correspond to an icon in the defined display area, and deleting data from the terminal device if the data do not correspond to an icon in the defined display area.

Another aspect of the present disclosure provides an apparatus for loading data into a terminal device. The apparatus includes a display module configured to display icons in a user interface of the terminal device and a determination module configured to determine whether data corresponding to the displayed icons meet a criterion for data loading. The criterion may be whether the displayed icons are in a defined display area. The apparatus further includes a data loading module configure to load data into the terminal device if the data meet the criterion for data loading and a deletion module configured to delete data from the terminal device if the data do not meet the criterion for data loading.

Embodiments consistent with the present disclosure only store, in the storage of a terminal device, data corresponding to icons in a defined display area. When a user slides a control on the screen to browse online storybooks, the icons corresponding to online storybooks would be moved in or out of the defined display area. The terminal device may download data corresponding to the icons that are moved into the defined display area. The terminal device may delete, from its storage, data corresponding to the icons that are moved out of the defined display area. This process of dynamically loading data into and deleting data from the terminal device optimizes the use of the storage capacity and CPU resources of the terminal device, and improves the operating efficiency of the terminal device.

Other aspects of the present disclosure can be understood by those skilled in the art in light of the description, the claims, and the drawings of the present disclosure.

BRIEF DESCRIPTION OF THE DRAWINGS

To illustrate embodiments of the invention, the following are a few drawings illustrating embodiments consistent with the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

A terminal device consistent with the present disclosure may be any computing device that can make network connections. A terminal device may be a mobile terminal, i.e., a mobile computing device or a smartphone. A terminal device may connect with a server and retrieve data from the server. An online storybook may be any paper, book, articles, or other contents that may be accessed through a user interface on a terminal device. A software application may display a cover page or an icon representing an online storybook in the user interface. The user may access the content of the online storybook through the user interface by, for example, clicking on the cover page or icon of the storybook. Although the present disclosure often describes the embodiments using the example of reading or browsing online storybooks, embodiments consistent with the present disclosure may be implemented to load and unload data for other online contents, such as contents related to music, videos, games, etc.

Figure 6:
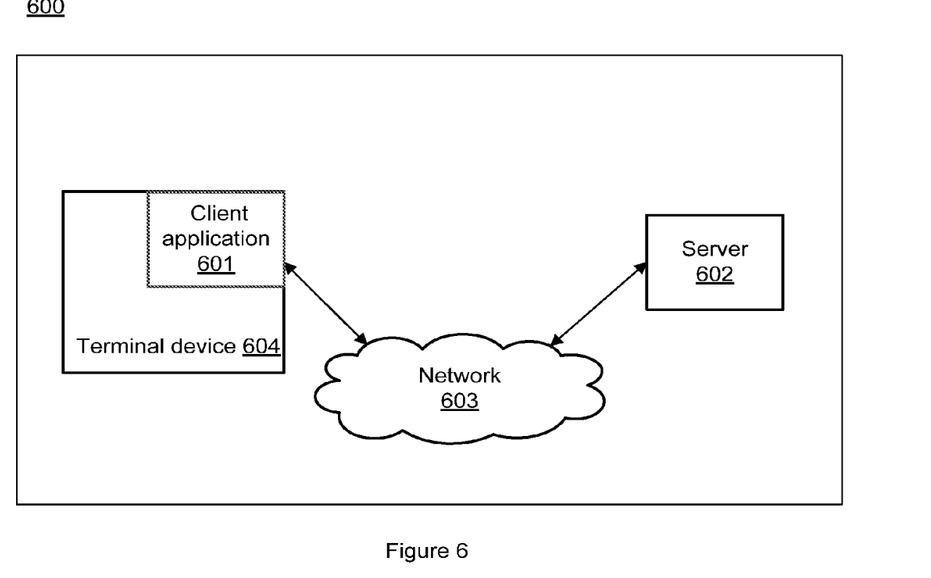
FIG. 6 illustrates an exemplary operating environment incorporating certain disclosed embodiments.

FIG. 6 illustrates an exemplary online computer environment 600 incorporating certain disclosed embodiments. As shown in FIG. 6, environment 600 may include terminal device 604, a network 603, and a server 602. The network 603 may include any appropriate type of communication network for providing network connections to the terminal device 604, and the server 602. For example, network 603 may include the Internet, LAN (Local Area Network), or other types of computer networks or telecommunication networks, either wired or wireless.

A server, as used herein, may refer to one or more server computers configured to provide certain functionalities, which may require any user accessing the services to authenticate to the server before the access. A server may also include one or more processors to execute computer programs in parallel. The server 602 may include any appropriate server computers configured to provide certain server functionalities, such as storing the content of online storybooks. Although only one server is shown, any number of servers can be included. The server 602 may operate in a cloud or non-cloud computing environment.

Terminal device 604 may include any appropriate type of mobile computing devices, such as iOS devices (e.g., an iPhone or iPad) or devices using any other computing platforms. Terminal device 604 may include one or more client applications 601. The client applications 601, as used herein, may include any appropriate software application, hardware application, or a combination thereof to achieve certain client functionalities. For example, client application 601 may be a web browser or an online storybook reading room. Any number of client applications 601 may be included in the environment 600.

In one embodiment, the terminal device 604 may connect to a server 602 to download contents of online storybooks. A user may use client application 601 to open an online storybook or read an online storybook.

Figure 7:
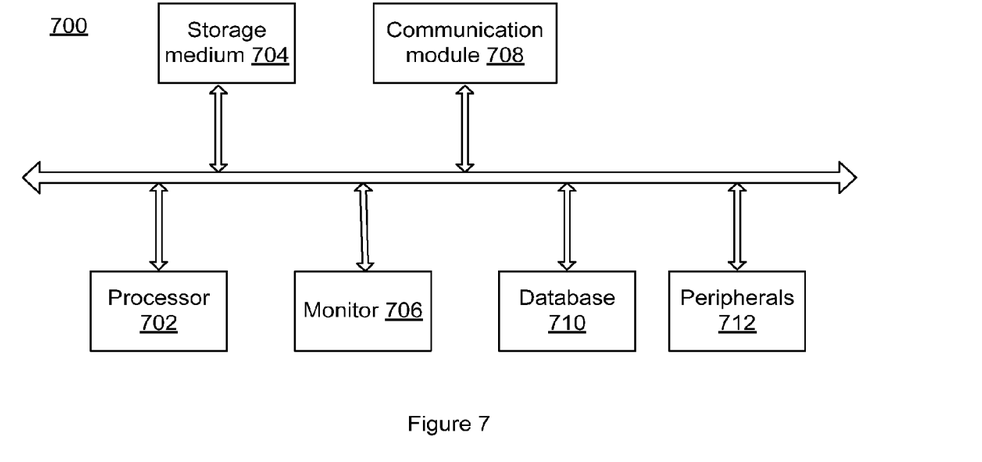
FIG. 7 illustrates a block diagram of an exemplary computer system consistent with the disclosed embodiments.

Terminal device 604 and server 602 may be implemented on any appropriate computing platform. FIG. 7 illustrates a block diagram of an exemplary computer system 700 capable of implementing terminal device 604 and server 602.

As shown in FIG. 7, computer system 700 may include a processor 702, a storage medium 704, a monitor 706, a communication module 708, a database 710, and peripherals 712. Certain devices may be omitted and other devices may be included.

Processor 702 may include any appropriate processor or processors. Further, processor 702 can include multiple cores for multi-thread or parallel processing. Storage medium 704 may include memory modules, such as Read-only memory (ROM), Random Access Memory (RAM), flash memory modules, and erasable and rewritable memory, and mass storages, such as CD-ROM, U-disk, and hard disk, etc. Storage medium 704 may store computer programs for implementing various processes, when executed by processor 702.

Further, peripherals 712 may include I/O devices such as keyboard and mouse, and communication module 708 may include network devices for establishing connections through the communication network. Database 710 may include one or more databases for storing certain data and for performing certain operations on the stored data, such as database searching.

Figure 1:
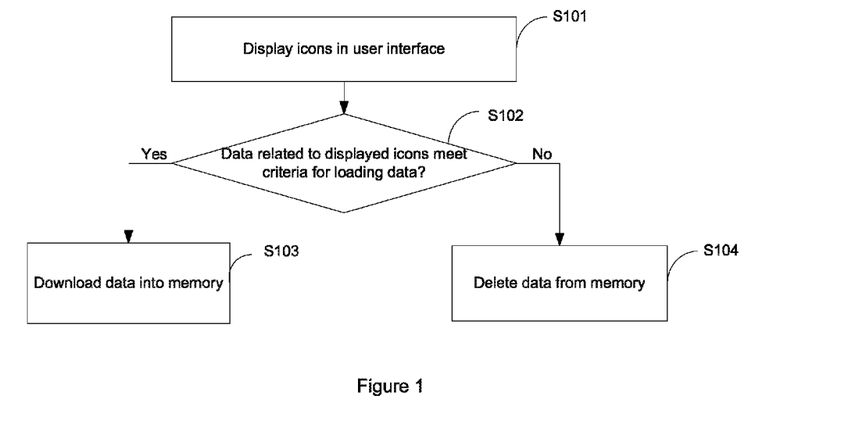
FIG. 1 is a flowchart of an exemplary method for loading data into a terminal device consistent with the present disclosure.

In operation, terminal device/client application 604/601 may retrieve data from server 602. FIG. 1 shows a flow chart of a data loading method implemented by embodiments consistent with the present disclosure. The method may comprise steps S101-S104.

In step S101, a terminal device may display icons in its user interface. The icons may represent online storybooks. The user interface may be a graphic interface of a software application capable of accessing and displaying the contents of the online storybooks. For example, the software application may be an online reading room in which the user may read online storybooks. An exemplary online reading room may be a game named "Baby Read," in which children can browse and read books through the user interface. The terminal device may also display icons related to other data, such as data related to online videos and games, etc.

Embodiments consistent with the present disclosure may use rounded square icons to present certain contents in the user interface of the terminal device. In the online reading room example, an icon may be a graphic representation of the cover page of an online storybook. Further, the terminal device may display an icon in the center of the user interface screen using a default format, such as a normal sized rounded square icon. The terminal device may further display icons according to how far they are from the center of the display. For example, the size of an icon displayed may be inversely correlated to the distance between the center of the display and the icon. That is, the closer the icon is to the center of the display, the larger the size of the icon. In addition, the tilt angle of the icon may be positively correlated to the distance between the center of the display and the icon. That is, the farther the icon is from the center of the display, the sharper the tilt angle.

In embodiments consistent with the present disclosure, a user may slide an icon or a control to move the icons displayed on the screen. In one embodiment, each online storybook may be displayed as an animated cover picture. Under the animated picture, the title of the online storybook may be displayed in an artistic font.

In step S102, the terminal device may determine whether the data related to the displayed icons meet preset criteria for data downloading. If the data meet the criteria, then the terminal device may execute step S103. If not, the terminal device may execute step S104. In one embodiment, the preset criteria for downloading data may be that the icon associated with the relevant data needs to be in a defined area of the display. That is, if an icon is within the defined area, then the terminal device may download the data related to the icon. In this example, a defined display area may be defined as the display area with a certain number of online storybook icons.

Figure 2:
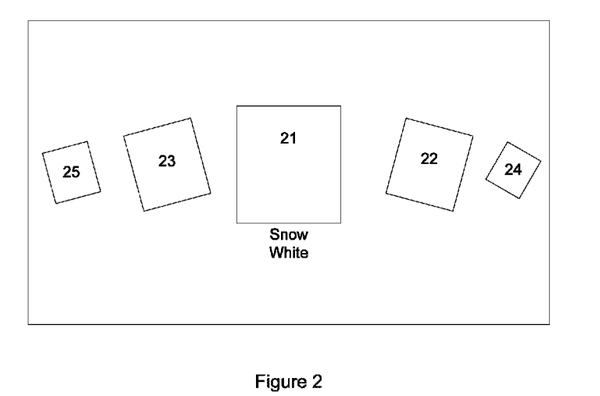
FIG. 2 is a schematic diagram of an exemplary terminal device user interface consistent with the present disclosure.

FIG. 2 shows an exemplary defined display area consistent with the present disclosure. As shown in FIG. 2, the terminal device may display a center positioned animated picture 21 (an icon) and pictures related other online storybooks 22-25 (other icons). The defined display area may be the display area that includes all five online storybook icons 21-25. Alternatively, the defined display area may the display area that includes three online storybook icons 21, 22, and 23. In addition, the terminal device may also use other criteria, such as whether the terminal device has reached its storage capacity limit, to determine whether to download data related to an icon.

Figure 5:
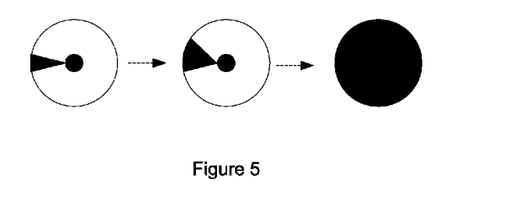
FIG. 5 illustrates an exemplary data loading status icon consistent with the present disclosure.

In step S103, the terminal device may download data that meet the preset criteria for data downloading. In embodiments consistent with the present disclosure, when the terminal device is downloading data, it may use a windmill rotation icon to show the progress of data downloading. The windmill rotation icon refers to a rotation icon that fills up a circle using the center as the rotation axis. FIG. 5 shows an exemplary windmill rotation icon used in embodiments consistent with the present disclosure.

When the terminal device downloads data to its memory, it may also determine whether the download process has stopped. If the data download has stopped, the terminal device may determine whether it has downloaded all data related to an online storybook. If the corresponding online storybook has not been fully downloaded, the terminal device may continue the data download.

In step S104, the terminal device may delete, from its memory, data that do not correspond to the icons in the defined display area. In embodiments consistent with the present disclosure, the terminal device may also check whether the user has instructed the device to delete the data corresponding to one or more of the online storybooks. If the user has checked the deletion mark of one the icons in the defined display area, the terminal device may then show the delete marks of all the other icons in the defined display area so that the user may determine whether other data should be deleted. Once the user checks the deletion mark on an icon, such as an icon for an online storybook, the terminal device may then present a screen to confirm the deletion request. Once the user confirms the deletion request, the terminal device may delete the data from its storage. The terminal device may remove the icon corresponding to the deleted data from the user interface, and replace it with another icon for a new online storybook.

Embodiments consistent with the present disclosure only store data corresponding to icons in a defined display area. When a user slides the screen to browse online storybooks, the icons corresponding to online storybooks would be moved in or out of the defined display area. The terminal device may download data corresponding to the icons that are moved into the defined display area. The terminal device may delete, from its storage, data corresponding to the icons that are moved out of the defined display area. This process of dynamically loading and deleting data stored on the terminal device optimizes the use of the storage capacity and CPU resources of the terminal device, and improves the operating efficiency of the terminal device.

Figure 3:
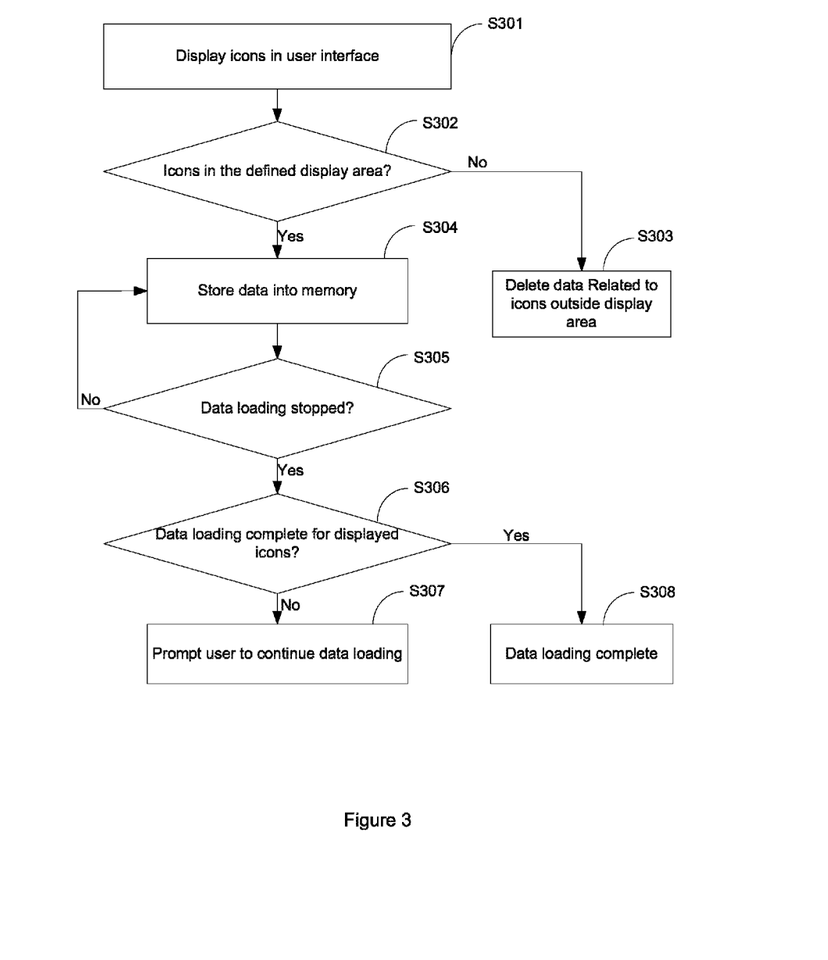
FIG. 3 is another flowchart of an exemplary method for loading data into a terminal device consistent with the present disclosure.

FIG. 3 shows a flow chart of another data loading method implemented by embodiments consistent with the present disclosure. The method includes steps S301-S308.

In step S301, a terminal device may display icons in its user interface. The icon may represent online storybooks. The icons may also represent other data, such as data related to online games, etc. Embodiments consistent with the present disclosure may use rounded square icons or pictures to present certain contents in the user interface of the terminal device. Further, the terminal device may display the icon in the center of the user interface screen using a default format, e.g., a normal sized rounded square icon. The terminal device may further display icons according to how far they are from the center positioned content. For example, the size of an icon displayed may be inversely correlated to the distance between the center of the display and the icon. That is, the closer an icon is to the center of the display, the larger the size of the icon. The tilt angle of the icon may be positively correlated to the distance between the center of the display and the icon. That is, the farther the icon is from the center of the display, the sharper the tilt angle.

In step S302, the terminal device may determine whether an icon is in a defined area of the display. If an icon is within the defined area, the terminal device may execute step S304. If not, the terminal device may execute step S303.

For example, a defined display area may be defined as the display area with a certain number of online storybook icons. FIG. 2 shows an exemplary defined display area consistent with the present disclosure. As shown in FIG. 2, the terminal device may display a center positioned animated picture 21 (icon), and pictures related other online storybooks 22-25 (icons). The defined display area may be the display area that includes all five online storybook icons 21-25.

In step S303, the terminal device may delete data corresponding to icons not in the defined display area from its memory. In step S304, the terminal device may download data corresponding to icons newly moved into the defined display area into its memory. In embodiments consistent with the present disclosure, the terminal device may display a windmill rotation icon to show the data downloading progress.

In step S305, the terminal device may determine whether the data loading process has stopped. In step S306, the terminal device may determine whether the data loading is complete for the icons in the defined display area. If the process is complete, the terminal device may execute step S307. If not, the terminal device may execute step S308.

In step S307, the terminal device may prompt the user so that the user may instruct the device to continue the data downloading process. In step S308, the terminal device may inform the user that the data corresponding to an online storybook have been downloaded.

Figure 4:
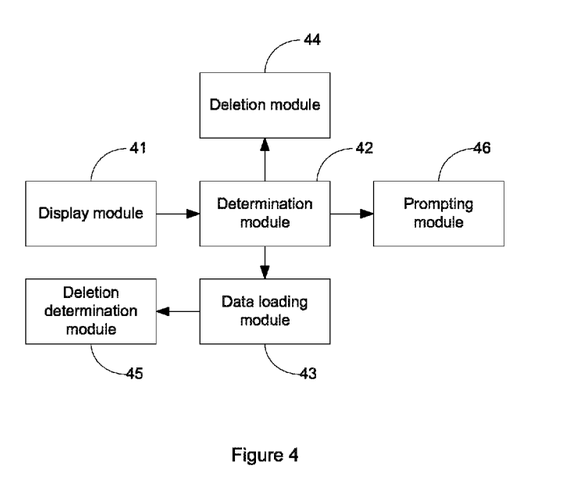
FIG. 4 is a block diagram of an exemplary terminal device consistent with the present disclosure.

FIG. 4 shows a block diagram of a data loading apparatus consistent with the present disclosure. The data loading apparatus may be implemented in a terminal device. The data loading apparatus further includes a display module 41, a determination module 42, a data loading module 43, a deletion module 44, a deletion determination module 45, and a prompting module 46.

The display module 41 may display contents in the user interface of the terminal device. A user may slide an icon to move the icons displayed on the screen. In one embodiment, each online storybook may be displayed as an icon showing an animated picture. Under the animated picture for an online storybook, the title of the online storybook may be displayed in an artistic font.

The display module 41 may display the content in the center of the user interface screen using a default format, e.g., a normal sized icon for an online storybook. The display module 41 may further display icons according to how far they are from the center positioned icon. For example, the size of an icon displayed may be inversely correlated to the distance between the center of the display and the icon. That is, the closer an icon is to the center of the display, the larger the size of the icon. The tilt angle of the icon may be positively correlated to the distance between the center of the display and the icon. That is, the farther the icon is from the center of the display, the sharper the tilt angle.

The determination module 42 may determine whether the data related to the displayed icons meet preset criteria for data downloading. If the data meet the criteria, then the data loading module 43 may download the data. If the data do not meet the criteria, then the deletion module 44 may delete the data from the memory of the terminal device.

When the data loading module 43 is loading data into the terminal device, the display module 41 may display a wind-mill rotation icon to show the progress of the data loading. The wind-mill rotation icon refers to a rotation icon that fills up a circle using the center as the rotation axis. FIG. 5 shows an exemplary wind-mill rotation icon used in embodiments consistent with the present disclosure.

The determination module 42 may determine whether an icon meets defined criteria for downloading. For example, if an icon is within the defined display area, then the terminal device may download the content related to the icon. In this example, a defined display area may be defined as the display area with a certain number of online storybook icons. FIG. 2 shows an exemplary defined display area consistent with the present disclosure.

The deletion determination module 45 may determine whether the data loading apparatus has received a user instruction to delete certain data. If the deletion determination module 45 determines that the user has requested deletion of the data corresponding to one of the online storybook icons, the display module 41 may then show the deletion marks of all the other icons in the defined display area so that the user may determine whether other data need to be deleted.

When the data loading module 43 is downloading data to the memory of the terminal device, the determination module 42 may also determine whether the download process has stopped. If the data download has stopped, the determination module 42 may determine whether it has completed the download of the corresponding online storybook. If the corresponding online storybook has not been fully downloaded, the prompting module 46 may prompt the user to continue the data download.

Embodiments consistent with the present disclosure only store the data corresponding to icons in a defined display area. When a user slides the screen to browse online storybooks, the icons corresponding to online storybooks would be moved in or out of the defined display area. The terminal device may download data corresponding to the icons that are moved into the defined display area. The terminal device may delete, from its storage, data corresponding to the icons that are moved out of the defined display area. This process of dynamically loading and deleting data stored on the terminal device optimizes the use of the storage capacity and CPU resources of the terminal device, and improves the operating efficiency of terminal device.

Consistent with embodiments of the present disclosure, one or more non-transitory storage medium storing a computer program are provided to implement the system and method for downloading data. The one or more non-transitory storage medium may be installed in a computer or provided separately from a computer. A computer may read the computer program from the storage medium and execute the program to perform the methods consistent with embodiments of the present disclosure. The storage medium may be a magnetic storage medium, such as hard disk, floppy disk, or other magnetic disks, a tape, or a cassette tape. The storage medium may also be an optical storage medium, such as optical disk (for example, CD or DVD). The storage medium may further be semiconductor storage medium, such as DRAM, SRAM, EPROM, EEPROM, flash memory, or memory stick.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods and systems, various data loading apparatus may be implemented. For example, a user may start an online bookstore by implementing embodiments consistent with present disclosure. A customer of the online bookstore may browse the books online using the online bookstore application. The bookstore application may download excerpts of the books that are in a defined display area into the customer's device. The bookstore application may also delete the excerpts of the online books as the customer moves the online books out of the defined display area. By storing only the most relevant book excerpts in the customer's device, the application uses the customer device's storage and CPU efficiently.

What is claimed is:

1. A method for loading data into a terminal device, the terminal device including a user interface for displaying icons, each icon representing a content, comprising:
    determining whether a first icon from the displayed icons is in a defined display area on the user interface, and whether a first data corresponding to the first icon exists in the terminal device, wherein the defined display area includes one or more icons;
    loading the first data corresponding to the first icon into the terminal device if the first icon is in the defined display area on the user interface and the first data corresponding to the first icon does not exist in the terminal device;
    when the first icon in the defined display area is selected by a user, presenting a corresponding content using the loaded first data; and
    deleting the first data corresponding to the first icon from the terminal device if the first icon is not in the defined display area on the user interface and the first data corresponding to the first icon is previously loaded into the terminal device.

2. The method according to claims 1, the method further comprising:
    identifying the defined display area based on number of icons displayed in an area on the user interface.

3. The method according to claims 1, the method further comprising:
    determining whether there is a request for deleting data corresponding to a displayed icon; and
    displaying deletion marks for other displayed icons.

4. The method according to claim 1, further comprising:
    determining whether a data loading process for loading the first data has stopped;

when it is determined that the data loading process has stopped, determining whether all of the first data corresponding to the first icon have been loaded into the terminal device; and when it is determined that not all of the first data corresponding to the first icon have been loaded into the terminal device, prompting a user to determine whether to continue the data loading process.

5. The method according to claims 1, further comprising:
moving icons into and out of the defined display area of the terminal device based on user input; and
displaying animated pictures as icons.

6. The method according to claims 1, further comprising:
displaying an icon in the center of the user interface by a default format; and
displaying other icons based on their positions relative to the center of the user interface.

7. The method according to claims 1, further comprising:
displaying a wind-mill rotation icon to show progress of a data loading process for loading the first data.

8. The method according to claims 7, wherein:
a tilt angle of the icon in the center of the user interface is zero; and
a tilt angle of an icon is positively correlated to a distance between the icon and the center of the user interface.

9. The method according to claim 1, further comprising:
when a second icon is moved into the defined display on the user interface according to a user input, dynamically loading a second data corresponding to the second icon into the terminal device.

10. The method according to claim 9, further comprising:
when the second icon is moved out of the defined display area on the user interface according to a user input, deleting the previously loaded second data corresponding to the second icon from the terminal device.

11. The method according to claims 9, wherein:
the icon in the center of the user interface has a largest size; and
a size of an icon is negatively correlated to the distance between the icon and the center of the user interface.

12. The method according to claims 1, further comprising:
deleting a previously loaded data from the terminal device if the previously loaded data do not correspond to any icon in the defined display area on the user interface.

13. An apparatus for loading data into a terminal device, comprising at least one processor, a memory, and a plurality of program modules stored in the memory and to be executed by the at least one processor, the plurality of program modules including:
a display module configured to display icons in a user interface of the terminal device, each icon representing a content;

a determination module configured to determine whether a first icon from the displayed icons is in a defined display area on the user interface, and whether a first data corresponding to the first icon exists in the terminal device, wherein the defined display area includes one or more icons;

a data loading module configure to load the first data corresponding to the first icon into the terminal device if the first icon is in the defined display area on the user interface and the first data corresponding to the first icon does not exist in the terminal device; and a deletion module configured to delete the first data corresponding to the first icon from the terminal device if the first icon is not in the defined display area on the user interface and the first data corresponding to the first icon is previously loaded into the terminal device;

wherein when the first icon in the defined display area is selected by a user, the display module is further configured to present a corresponding content using the loaded first data.

14. The apparatus according to claim 13, wherein the determination module identifies the defined display area based on number of icons in an area of the user interface.

15. The apparatus according to claim 14, wherein the determination module determines whether there is a request for deleting data corresponding to one of the displayed icons.

16. The apparatus according to claim 15, wherein the display module displays deletion marks for other displayed icons.

17. The apparatus according to claim 14, wherein the display module displays an icon in the center of the user interface by a default format and display other icons based on their positions relative to the center of the user interface.

18. The apparatus according to claims 14, wherein the display module displays a wind-mill rotation icon to show progress of a data loading process for loading the first data.

19. The apparatus according to claim 13, wherein the determination module determines whether a data loading process for loading the first data has stopped; and when it is determined that the data loading process has stopped, determines all of the first data corresponding to the first icon have been loaded into the terminal device.

20. The apparatus according to claim 19, further comprising:
a prompting module configured to prompt a user to determine whether to continue the data loading process when the determination module determines that not all of the first data corresponding to the first icon have been loaded into the terminal device.

* * * * *